United States Patent [19]

Baney

[11] 4,310,481

[45] Jan. 12, 1982

[54] HIGH YIELD SILICON CARBIDE PRE-CERAMIC POLYMERS

[75] Inventor: Ronald H. Baney, Midland, Mich.

[73] Assignee: Dow Corning Corporation, Midland, Mich.

[21] Appl. No.: 171,551

[22] Filed: Jul. 23, 1980

[51] Int. Cl.$^3$ .............................................. F27B 9/04
[52] U.S. Cl. ...................... 264/65; 501/88; 260/37 SB; 423/345; 427/350; 427/387; 428/446; 428/447; 428/429; 556/430; 528/12; 528/23; 528/33; 528/35
[58] Field of Search ............................ 264/65; 106/44; 423/345; 427/350, 387; 428/446, 447, 429; 260/37 SB; 556/430, 468; 528/12, 23, 33, 35

[56] References Cited

U.S. PATENT DOCUMENTS

| | | | |
|---|---|---|---|
| 3,852,567 | 12/1974 | Verbeek | 106/44 |
| 3,925,133 | 12/1975 | Olcott | 106/44 |
| 3,993,602 | 11/1976 | Prochazka | 106/44 |

*Primary Examiner*—Melvyn I. Marquis
*Attorney, Agent, or Firm*—Robert L. McKellar

[57] ABSTRACT

Pre-polymers which are substituted with $(CH_3)_3SiO$- groups are useful for the preparation of fine grained silicon carbide ceramic materials. The pre-polymers exhibit ease of handling and their use to obtain silicon carbide ceramic materials results in high yields.

11 Claims, No Drawings

HIGH YIELD SILICON CARBIDE PRE-CERAMIC POLYMERS

BACKGROUND OF THE INVENTION

The concept of preparing silicon carbide ceramic materials or silicon carbide-containing ceramics from silicon carbide ceramic materials is not new. As applied to the preparation of silicon carbide-containing ceramics from the degradation of polymers, any number of published articles or issued patents have appeared.

Yajima in U.S. Pat. No. 4,052,430, issued Oct. 4, 1977, has described the preparation of polycarbosilanes prepared by pyrolyzing the polysilanes generated by the reaction of sodium or lithium metal with dimethyldichlorosilane. These polycarbosilanes can be heated to yield beta-silicon carbide.

West and Maszdiazni reported in the 22nd AFOSR Chemistry Program Review FY77, R. W. Heffner ed. March (1978), that a polymer, made by reacting dimethyldichlorosilane with methylphenyldichlorosilane and an alkali metal, could be fired at high temperatures to yield whiskers of beta-silicon carbide.

Verbeek has shown in U.S. Pat. No. 3,853,567, the preparation of a mixed ceramic of silicon carbide and silicon nitride by pyrolyzing a polysilazane. In addition, Verbeek has prepared a polycarbosilane suitable for molding by heating organosilicon polymers optionally mixed with silicon dioxide or organic polymers at a temperature between 400° and 1200° C.

Rice et al., in U.S. Pat. No. 4,097,794 issued June 27, 1978, have suggested that almost anything containing silicon can be pyrolyzed to give a ceramic material.

Baney, in U.S. Pat. application Ser. No. 910,247, filed May 30, 1978, now abandoned, and continued as a continuation-in-part, Ser. No. 024,137, filed Mar. 26, 1979, now abandoned and continued as a continuation-in-part of Ser. No. 135,567, filed Mar. 31, 1980 disclosed a methylhalopolysilane which can be fired at 1200° C. or higher to yield fine grain beta-silicon carbide. The yields and handling characteristics of these latter polysilanes were enhanced over the prior materials.

Mention should be made of recent Japanese patent publications Nos. 80500/78 and 101099/78 in the name of Takamizawa et al. These publications deal with polymers made from methylchlorodisilanes but no mention is made of the yields of ceramic materials generated by the decomposition of the polysilanes. Recent publications by Nakamura (Japanese Kokais Nos. 79/114600 and 79/83098) suggest that the preparation of silicon carbide precursor polymers having a silicon carbon (-Si-C-Si-) backbone are prepared by heating organosilicon compounds (including $(CH_3)_3SiSi(CH_3)_2Cl$) in the presence of B, Al, Si, Ge, Sn and Pb compounds or HI and its salts, at high temperatures.

It has now been determined that high yields of silicon carbide ceramic materials and silicon carbide-containing ceramics can be obtained from the methods and the new materials of the instant invention.

The Invention

This invention deals with a process for obtaining new and novel polysilanes which process consists of a method of preparing a polysilane having the average formula $$\{(CH_3)_2Si\}\{CH_3Si\} \qquad (I)$$

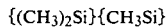

in which polysilane there is from 0 to 60 mole percent $(CH_3)_2Si=$ units and 40 to 100 mole percent $CH_3Si\equiv$ units, wherein there is also bonded to the silicon atoms other silicon atoms and the $(CH_3)_3SiO-$ radical wherein there is present in the polysilane 23 to 61 weight percent of $(CH_3)_3SiO-$, based on the weight of the polysilane which method consists of (A) reacting a polysilane having the average unit formula $$\{(CH_3)_2Si\}\{CH_3Si\} \qquad (II)$$

in which there is from 0 to 60 mole percent $(CH_3)_2)Si=$ units and 40 to 100 mole percent $CH_3Si\equiv$ units, wherein the remaining bonds on the silicon atoms are attached to either another silicon atom, a chlorine atom or a bromine atom such that the polysilane contains from 10—43 weight percent, based on the weight of the polysilane, of hydrolyzable chlorine or 21–62 weight percent based on the weight of the polysilane of hydrolyzable bromine, with (i) $(CH_3)_3SiOSi(CH_3)_3$, (ii) a strong acid and (iii) at least a stoichiometric amount of water, based on the amount of halogen in polysilane (II), at a temperature of from 25° C. to 125° C. for a period of from ½ to 24 hours, in a suitable solvent, and (B) thereafter recovering the polysilane (I).

This invention also deals with a composition of matter which is a polysilane having the average formula $$\{(CH_3)_2Si\}\{CH_3Si\} \qquad (I)$$

in which polysilane there is from 0 to 60 mole percent $(CH_3)_2Si=$ units and 40 to 100 mole percent $CH_3Si\equiv$ units, wherein there is also bonded to the silicon atoms other silicon atoms and the $(CH_3)_3SiO-$ radical wherein there is present in the polysilane 23 to 61 weight percent of $(CH_3)_3SiO-$ based on the weight of the polysilane. Further, this invention deals with shaped articles made from the polysilanes, with, or without fillers, and a method by which the shaped articles are obtained.

This invention also consists of a method of preparing silicon carbide ceramic materials which consists of heating a polysilane having the average unit formula $$\{(CH_3)_2Si\}\{CH_3Si\}$$

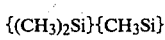

in which polysilane there is from 0 to 60 mole percent $(CH_3)_2Si=$ units and 40 to 100 mole percent $CH_3Si\equiv$ units, wherein there is also bonded to the silicon atoms other silicon atoms and the $(CH_3)_3SiO-$ radical wherein there is present in the polysilane 23 to 61 weight percent of $(CH_3)_3SiO-$ based on the weight of the polysilane, in an inert atmosphere or in a vacuum to an elevated temperature in the range of 1150° to 1600° C. until the polysilane is converted to silicon carbide ceramic material.

The inventions described herein represent an improvement over the art, in that, higher yields of silicon carbide ceramic materials are obtained upon pyrolysis of the polysilanes and the polysilanes herein are much easier and safer to handle because the replacement of the halogen substituents with $-OSi(CH_3)_3$ radicals limits hydrolysis and thus reduces the quantity of corrosive HCl or HBr gas liberated.

This invention results from replacing halogen atoms on the above described polyhalosilanes with (CH₃)₃SiO— radicals, the resulting product, upon pyrolysis, gives silicon carbide ceramic materials.

The polyhalosilane starting materials are those set forth and described in the Baney patent application Ser. No. 910,247, filed May 30, 1978, now abandoned, and continued as a continuation-in-part, Ser. No. 024,137, filed Mar. 26, 1979, now abandoned and continued as a continuation-in-part as Ser. No. 135,567, filed Mar. 31, 1980 which are hereby incorporated by reference.

The starting materials are those described in the Baney application which consist of 10–43 weight percent, based on the weight of the polysilane, of hydrolyzable chlorine or 21–62 weight percent, based on the weight of the polysilane, of hydrolyzable bromine.

These polyhalosilane starting materials can be prepared by treating methylhalodisilanes with catalysts such as (C₄H₉)₄P+Cl— or, they can be prepared by treating halosilane residue which is derived from the Direct Synthesis of halosilanes. The aforementioned disilane is found in large quantities in the residue (see Eaborn, "Organosilicon Compounds", Butterworths Scientific Publications, 1960, page 1).

The polyhalosilane starting materials are then subjected to a treatment with (CH₃)₃SiOSi(CH₃)₃ to obtain the inventive polysilane.

Generally, the process consists of placing a toluene solution of the starting polyhalosilane in a suitably equipped reaction vessel and thereafter adding the (CH₃)₃SiOSi(CH₃)₃ and strong acid directly into the reaction vessel as a liquid and thereafter, water is added in sufficient quantity to hydrolyze the chlorine atoms. After the initial reaction has taken place, the reaction mass is stirred and sometimes heated to ensure complete reaction. It is then cooled, neutralized and filtered. The resulting products are either solids or liquids depending on the starting materials.

These materials are then shaped (if desired), filled with ceramic type fillers (if desired) and fired to temperatures of 1150° C. or higher in vacuo or in an inert atmosphere to obtain silicon carbide ceramic materials or silicon carbide ceramic material-containing ceramic articles.

Thus, this invention contemplates the preparation of a filled ceramic article prepared from the silicon carbide ceramic materials of this invention. The method consists of (A) mixing a polysilane with at least one conventional ceramic filler which polysilane has the average formula {(CH₃)₃Si}{CH₃Si} in which polysilane there is from 0 to 60 mole percent (CH₃)₂Si= units and 40 to 100 mole percent CH₃Si≡ units, wherein there is also bonded to the silicon atoms other silicon atoms and the (CH₃)₃SiO— radical wherein there is present in the polysilane 23 to 61 weight percent of (CH₃)₃SiO— based on the weight of the polysilane, (B) forming an article of the desired shape from the mixture of polysilane and fillers and, (C) heating the article formed in (B) in an inert atmosphere or in a vacuum to an elevated temperature in the range of 1150° C. to 1600° C. until the polysilane is converted to a silicon carbide-containing ceramic.

It is also contemplated within the scope of this invention to prepare articles which are coated with the silicon carbide ceramic materials of this invention which are then pyrolyzed to give articles coated with silicon carbide-containing ceramics. Thus, the method of preparing such an article coated with ceramic consists of (A) mixing a polysilane with at least one conventional ceramic filler which polysilane has the average unit formula {(CH₃)₂Si}{CH₃Si} in which polysilane there is from 0 to 60 mole percent (CH₃)₂Si= units and 40 to 100 mole percent CH₃Si≡ units, wherein there is also bonded to the silicon atoms other silicon atoms and the (CH₃)₃SiO— radical wherein there is present in the polysilane 23 to 61 weight percent of (CH₃)₃SiO— based on the weight of the polysilane, (B) coating a substrate with the mixture of polysilane and fillers and, (C) heating the coated substrate in an inert atmosphere or in a vacuum to an elevated temperature in the range of 1150° C. to 1600° C. until the coating is converted to a silicon carbide ceramic material, whereby a silicon carbide-containing ceramic coated article is obtained.

The acids useful herein are those acids that are known to those skilled in the art for the rearrangement of siloxane bonds, for example, F₃CSO₃H and sulfuric acid. The acid F₃CSO₃H is preferred for this invention.

Generally, the (CH₃)₃SiOSi(CH₃)₃ is used in a stoichiometric excess to ensure that the reaction is enhanced. Excess (CH₃)₃SiOSi(CH₃)₃ as well as any solvents, water and byproducts can be stripped or strip distilled at the end of the reaction.

Solvents for the starting polyhalosilanes can be any organic solvent in which the material is soluble and which does not react with the material except in the desired manner. Examples of useful solvents include toluene, xylene, benzene, tetrahydrofuran and ethers. Specifically, toluene is preferred.

Generally, the order of addition of the components is not critical, but it has been found preferable to add the (CH₃)₃SiOSi(CH₃)₃ and acid to the polyhalosilane in a solvent solution, such as toluene. Then the water is added. The addition and reaction is carried out while the materials are stirred or otherwise agitated.

The reaction can be run at temperatures of 25° C. to 125° C. but preferably the reaction is run at room temperature or slightly above room temperature to prevent or decrease undesirable side reactions. After the addition of the (CH₃)₃SiOSi(CH₃)₃, acid and water is complete, the reaction mixture is stirred for a time, with or without heating, to ensure the completion of the reaction.

The reaction mixture is cooled to room temperature, if necessary, and then filtered by conventional means and the solvents and other volatile materials are then removed by stripping under vacuum, with the addition of heat if necessary. The resulting polysilanes are liquids or solids depending on the polyhalosilane starting material and the reaction conditions used.

The resulting materials are then formed into shapes such as by melt spinning and fired at elevated temperatures to yield silicon carbide ceramic materials.

Filled silicon carbide ceramic materials can be made by adding fillers and adjuvants to the polysilane before firing.

For example, fine silicon carbide, silicon nitrides, oxides, silica, alumina, glass and silicates can be used as fillers in the polysilanes of this invention and when the mixture is fired, high strength ceramic articles result. Preferred are powdered silicon carbide and silicon nitrides.

Fillers and adjuvants can be milled on 3 roll mills by simply mixing the polysilanes of this invention with the fillers and making several passes on the mill. The mixture is then shaped to the desired form and then fired to prepare the silicon carbide ceramic article.

Usually, the materials of this invention, whether filled or unfilled, are heated to 1150° C. and above to ceramify them. Generally, 1600° C. is usually the hottest temperature required to convert the polysilanes to silicon carbide. Thus, heating the polysilanes from 1150° C. to 1600° C. will suffice to give optimum physical properties in the final ceramic produt.

The following examples are given for purposes of illustration and are not intended to limit the scope of this invention.

Titration of chloride ion in these examples was carried out in a solution of toluene and isopropanol (essentially non-aqueous) using a 0.1% solution of tetrabromophenophthalein ethyl ester in methanol/toluene. Titration was carried out using 0.5N KOH in ethanol.

EXAMPLE 1

Preparation of the Polychlorosilane

Four hundred and eighty-one and one-tenth grams of tetramethyldichlorodisilane was treated with 1.4 grams (0.3 weight percent) of tetrabutyl phosphonium chloride in a 500 ml., 3-necked round bottomed glass flask under an argon blanket. The initial addition caused the reaction mixture to clear momentarily and at about 53° C. the reaction mass turned cloudy white. At 84° C., the color turned from white to yellow. Distillation of by-produced chlorosilane monomers began at 117.5° C. and the reaction mixture cleared. The flask was heated to 145° C. and held a short period and then allowed to cool overnight with stirring while the argon blanket was continued. In the morning, the temperature was raised to 250° C. and held for 1 hour and then cooled to yield a yellowish white solid. A sample of the yellowish white solid contained 18.25 weight percent hydrolyzable chlorine.

Example 2

Preparation of the Inventive Polysilane

Fifty grams of the polychlorosilane prepared in Example 1 was mixed with 150 grams of hexamethyldisiloxane and 100 grams of toluene to form a clear yellow solution. Approximately 1.0 ml of F$_3$CSO$_3$H was then added. Two times the stoichiometric amount of water to hydrolyze the chlorine (9 grams) was then added and a phase separation occurred. The reaction mixture was then stirred overnight at room temperature. The reaction mixture was then subjected to vacuum for 2 hours and then refluxed for three hours under argon. The yellowish organic layer was decanted from the water layer and dried over MgSO$_4$. After filtering, NaHCO$_3$ was added (10 grams) and the slurry was allowed to stand overnight. The slurry was filtered and the filtrate was stripped of solvent to yield a yellow foamy material. The residual chlorine content was 1.1 weight percent.

Thermal Gravimetric Analysis (TGA) of a sample of the yellow foamy material showed a 24% weight loss at 155°–850° C. and an additional 8.4% weight loss at 850° to 1555° C. The resulting fine grained material was identified by X-ray as being mostly beta-silicon carbide having an average grain size of 30 Å ± 10 Å.

A second programmed TGA gave the following results.

| temperature | % yield |
|---|---|
| room temperature | 100.0 |
| 1200° C. | 40.1 |
| 1600° C. | 31.6 |

The material when fired to 2000° C. was light green in color and was fine grained.

A polymeric polycarbosilane material prepared by Yajima et al. was reported to yield about 24% of silicon carbide at 1330° C. (Nature, Vol. 261, No. 5562, pages 683–685 (1976)).

That which is claimed is:

1. A method of preparing a polysilane having the average formula $$\{(CH_3)_2Si\}\{CH_3Si\} \qquad (I)$$

in which polysilane there is from 0 to 60 mole percent (CH$_3$)$_2$Si= units and 40 to 100 mole percent CH$_3$Si≡ units, wherein there is also bonded to the silicon atoms other silicon atoms and the (CH$_3$)$_3$SiO— radical wherein there is present in the polysilane 23 to 61 weight percent of (CH$_3$)$_3$SiO—, based on the weight of the polysilane which method consists of (A) reacting a polysilane having the average unit formula $$\{(CH_3)_2Si\}\{CH_3Si\} \qquad (II)$$

in which there is from 0 to 60 mole percent (CH$_3$)$_2$Si= units and 40 to 100 mole percent CH$_3$Si≡ units, wherein the remaining bonds on the silicon atoms are attached to either another silicon atom, a chlorine atom or a bromine atom such that the polysilane contains from 10–43 weight percent, based on the weight of the polysilane, of hydrolyzable chlorine or 21–62 weight percent based on the weight of the polysilane of hydrolyzable bromine, with (i) (CH$_3$)$_3$SiOSi(CH$_3$)$_3$,
(ii) a strong acid and
(iii) at least a stoichiometric amount of water, based on the amount of halogen in polysilane (II), at a temperature of from 25° C. to 125° C. for a period of from ½ to 24 hours, in a suitable solvent, and (B) thereafter recovering the polysilane (I).

2. A method of preparing a polysilane as claimed in claim 1 wherein there is present 0.1 to 10 weight percent, based on the weight of the polysilane, of a strong acid and a stoichiometric quantity of (CH$_3$)$_3$SiOSi(CH$_3$)$_3$ based on the amount of halogen in the polysilane (II).

3. A composition of matter consisting essentially of a polysilane having the average unit formula $$\{(CH_3)_2Si\}\{CH_3Si\}$$

in which polysilane there is from 0 to 60 mole percent (CH$_3$)$_2$Si= units and 40 to 100 mole percent CH$_3$Si≡ units, wherein there is also bonded to the silicon atoms other silicon atoms and the (CH$_3$)$_3$SiO— radical wherein there is present in the polysilane 23 to 61 weight percent of (CH$_3$)$_3$SiO— based on the weight of the polysilane.

4. A method of preparing silicon carbide ceramic material which consists of heating a polysilane having the average unit formula {(CH₃)₂Si}{CH₃Si} in which polysilane there is from 0 to 60 mole percent (CH₃)₂Si≡ units and 40 to 100 mole percent CH₃Si≡ units, wherein there is also bonded to the silicon atoms other silicon atoms and the (CH₃)₃SiO— radical wherein there is present in the polysilane 23 to 61 weight percent of (CH₃)₃SiO— based on the weight of the polysilane, in an inert atmosphere or in a vacuum to an elevated temperature in the range of 1150° C. to 1600° C. until the polysilane is converted to silicon carbide ceramic material.

5. Silicon carbide ceramic material prepared by the method as claimed in claim 4.

6. A method of preparing a silicon carbide-containing ceramic article which consists of
  (A) forming an article of the desired shape from a polysilane having the average formula {(CH₃)₂Si}{CH₃Si} in which polysilane there is from 0 to 60 mole percent (CH₃)₂Si≡ units and 40 to 100 mole percent CH₃Si≡ units, wherein there is also bonded to the silicon atoms other silicon atoms and the (CH₃)₃SiO— radical wherein there is present in the polysilane 23 to 61 weight percent of (CH₃)₃SiO— based on the weight of the polysilane and
  (B) heating the article formed in (A) in an inert atmosphere or in a vacuum to an elevated temperature in the range of 1150° C. to 1600° C. until the polysilane is converted to silicon carbide-containing ceramic.

7. The article prepared by the method of claim 6.

8. A method of preparing a filled ceramic article which consists of
  (A) mixing a polysilane with at least one conventional ceramic filler which polysilane has the average formula {(CH₃)₂Si}{CH₃Si} in which polysilane there is from 0 to 60 mole percent (CH₃)₂Si≡ units and 40 to 100 mole percent CH₃Si≡ units, wherein there is also bonded to the silicon atoms other silicon atoms and the (CH₃)₃SiO— radical wherein there is present in the polysilane 23 to 61 weight percent of (CH₃)₃SiO— based on the weight of the polysilane,
  (B) forming an article of the desired shape from the mixture of polysilane and fillers and,
  (C) heating the article formed in (B) in an inert atmosphere or in a vacuum to an elevated temperature in the range of 1150° C. to 1600° C. until the polysilane is converted to a silicon carbide-containing ceramic.

9. An article prepared by the method of claim 8.

10. A method of preparing an article coated with ceramic which consists of
  (A) mixing a polysilane with at least one conventional ceramic filler which polysilane has the average unit formula {(CH₃)₂Si}{CH₃Si} in which polysilane there is from 0 to 60 mole percent (CH₃)₂Si≡ units and 40 to 100 mole percent CH₃Si≡ units, wherein there is also bonded to the silicon atoms other silicon atoms and the (CH₃)₃SiO— radical wherein there is present in the polysilane 23 to 61 weight percent of (CH₃)₃SiO— based on the weight of the polysilane,
  (B) coating a substrate with the mixture of polysilane and fillers and,
  (C) heating the coated substrate in an inert atmosphere or in a vacuum to an elevated temperature in the range of 1150° C. to 1600° C. until the coating is converted to a silicon carbide ceramic material, whereby a silicon carbide-containing ceramic coated article is obtained.

11. An article prepared by the method of claim 10.

* * * * *

UNITED STATES PATENT AND TRADEMARK OFFICE
CERTIFICATE OF CORRECTION

PATENT NO. : 4310481
DATED : January 12, 1982
INVENTOR(S) : Ronald H. Baney

It is certified that error appears in the above-identified patent and that said Letters Patent is hereby corrected as shown below:

In Column 2, line 14, "$(CH_3)_2)Si\equiv$" should read

-- $(CH_3)_2Si=$ --.

In Column 8, line 5, "$(CH_3)_2Si\equiv$" should read

-- $(CH_3)_2Si=$ --.

Signed and Sealed this

Ninth Day of October 1984

[SEAL]

Attest:

GERALD J. MOSSINGHOFF

Attesting Officer

Commissioner of Patents and Trademarks